DATA HANDLING ARRANGEMENTS

Filed Jan. 22, 1971 4 Sheets-Sheet 1

INVENTORS:
ERIC A.N. WHITEHEAD
HENRY G CARPENTER
PETER D. CHINN
By: [signature]
ATTORNEYS

DATA HANDLING ARRANGEMENTS

INVENTORS:
ERIC A. N. WHITEHEAD
HENRY G. CARPENTER
PETER D. CHINN

By:

ATTORNEYS.

DATA HANDLING ARRANGEMENTS

Filed Jan. 22, 1971 4 Sheets-Sheet 3

INVENTORS:
ERIC A. N. WHITEHEAD
HENRY G. CARPENTER
PETER D. CHINN
By Smith, Michael, Bradford & Gardiner
ATTORNEYS INVENTORS
ERIC A. N. WHITEHEAD
HENRY G. CARPENTER
PETER D. CHINN
By: Smith Michael Bradford & Gordon
Attorneys

United States Patent Office 3,716,784

Patented Feb. 13, 1973

3,716,784

DATA HANDLING ARRANGEMENTS

Eric A. N. Whitehead, London, Henry G. Carpenter, Barton-on-Sea, and Peter D. Chinn, London, England, assignors to Elliott Brothers (London) Limited, London, England Continuation-in-part of abandoned application Ser. No. 723,434, Apr. 23, 1968. This application Jan. 22, 1971, Ser. No. 108,754

Claims priority, application Great Britain, Apr. 27, 1967, 11,249/67

Int. Cl. G01r 23/16, 23/00

U.S. Cl. 324—77 B 9 Claims

ABSTRACT OF THE DISCLOSURE

A data handling system for transmitting the frequency spectrum of an input band-limits the input, converts it into a rectangular waveform, and gates the "mark" pulses of the waveform with clock pulses. Each set of gated clock pulses, representing in number the width of the "mark" pulse, is fed into a binary counter. Sampling means, operative at a submultiple of the clock pulses, repeatedly samples the count of the counter and transmits the binary count values to a receiver. There, they are converted into a rectangular waveform whose amplitude varies with the digital values, and the rectangular waveform, whose frequency spectrum corresponds with the frequency spectrum of the band-limited input, is then fed to a frequency analyser. In a multi-channel version of the system, in which the input to each channel is derived from a respective one of an array of transducers, the counters of the channels are sampled sequentially and transmitted to the receiver which weights and combines them so as to produce an output representing the response of the array in a particular one of several different directions.

CROSS REFERENCE TO RELATED APPLICATIONS

This application is a continuation-in-part of application Ser. No. 723,434, filed Apr. 23, 1968 now abandoned.

BACKGROUND OF THE INVENTION

The invention relates to data handling systems.

According to the invention, there is provided a data handling system for transmitting information representing the frequency spectrum of an input, comprising means for converting the input into an electrical signal having a substantially rectangular waveform each of whose changes in amplitude corresponds with the crossing by the input of a predetermined datum level, means operative regularly to sample the digital value of the rectangular waveform, whereby the sample digital values represent the frequency spectrum of the input signal, and means for sequentially transmitting the sampled digital values.

According to the invention, there is also provided a data handling system responsive to the frequency spectrum of an input, comprising means operative to convert the input into an electrical signal having a substantially rectangular waveform which changes from one of two amplitudes to the other in correspondence with each crossing by the input of a predetermined datum level, digitising means operative only while the rectangular waveform has a first one of the two amplitude values to accumulate a regular digital count, sampling means operative at each of periodic instants to sample the value of the accumulated digital count such that successive sampled values are related to each other in a manner determined by the frequency spectrum of the input, and means operative to transmit the sampled values.

DESCRIPTION OF THE DRAWINGS

Data handling systems embodying the invention will now be described, by way of example only, with reference to the accompanying drawings in which.

DESCRIPTION OF PREFERRED EMBODIMENTS

Figure 1:
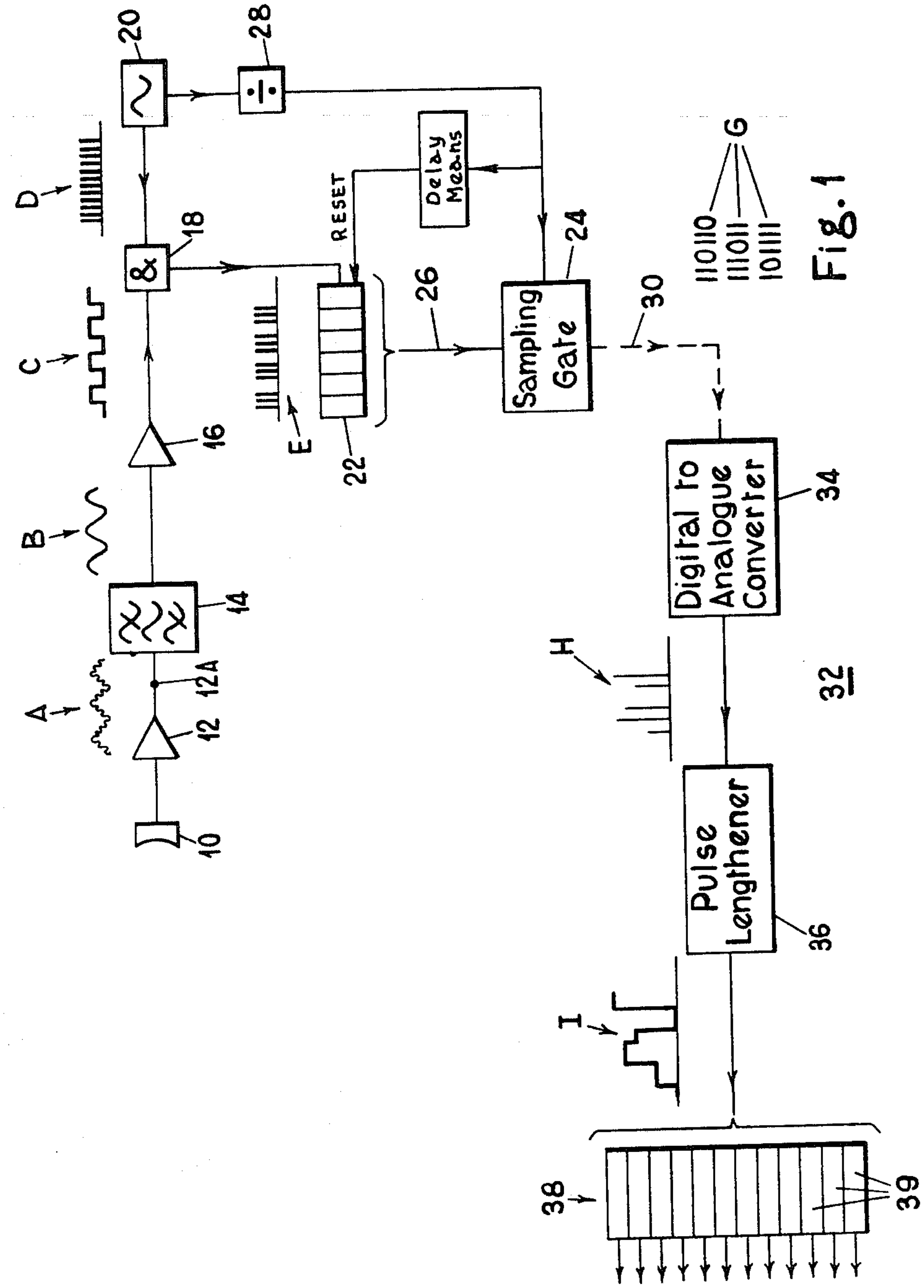
FIG. 1 is a block diagram of one of the systems.

The system of FIG. 1 is for transmitting data comprising a required portion of the frequency spectrum of sound energy picked up by a transducer. However, systems embodying the invention are not limited to such an application but may be used, for example, where the energy is radio energy picked up by an aerial and/or may be used to transmit data comprising the amplitude and/or phase of the energy relative to some other signal.

The system comprises a transducer 10 which senses the sound energy and converts it into a corresponding electrical signal which is amplified in a wide band pre-amplifier 12 to produce the waveform A (shown merely as an example). The amplified signal is fed into a bandpass filter 14 having a pass band of, in this example, less than 1½ octaves which produces an output wave of the form shown at B. The filtered signal is then clipped in a limiting amplifier 16 which produces a rectangular wave output C. The vertical portions of the waveform C coincide in time with the zeros in the band width limited version (waveform B) of the original signal picked up by the transducer 10.

The waveform C is then fed into an AND gate 18 which also receives clock pulses D from a pulse generator 20. The output from the gate 18 therefore has a waveform E, corresponding to a positive half cycle of the rectangular waveform C and containing a number of pulses at the frequency of the pulse generator 20, the number being dependent on the width of the half cycle.

The output E from the gate 18 is fed into a binary counter 22 having a plurality of stages, the first (the least significant) of which is connected to receive the output E.

The stages of the counter 22 are connected to a sampling gate 24 by a channel 26. The sampling gate 24 is controlled by the output of a pulse frequency divider 28 which receives the clock pulses D from the generator 20. Therefore, the sampling gate 24 is activated at a submultiple of the frequency of the clock pulses D. Each time the gate 24 is activated, the states ("1" or "0") of the counter 22 are sensed, and a group G of binary signals, each signal of which represents the state of a respective one of the counter stages, is transmitted over a telemetry link 30 to receiving equipment 32. The telemetry link 30 may comprise a wire or a wire-less link according to the particular application, and the signals may be transmitted in the binary form in which they are read from the counter 22 or, for example, by means of a frequency shift keying system.

The receiving equipment 32 may take any one of several different forms, and the form shown in FIG. 1 is merely by way of example. As shown in FIG. 1, each group G of binary signals is fed into a digital to analogue converter 34 which produces output pulses H each of whose amplitudes corresponds to the count value represented by a particular one of the groups G of binary signals. These analogue pulses H are then fed into a pulse lengthening circuit 36 which produces a rectangular waveform I corresponding to the pulses received.

The ouput I is then fed into a frequency analysing arrangement 38 comprising a bank of differently tuned filters 39 each having a respective output terminal at which is produced a signal whose amplitude, relative to the amplitude of the other signals, represents the relative signal amplitude at the particular tuned frequency of the filter.

Figure 2:
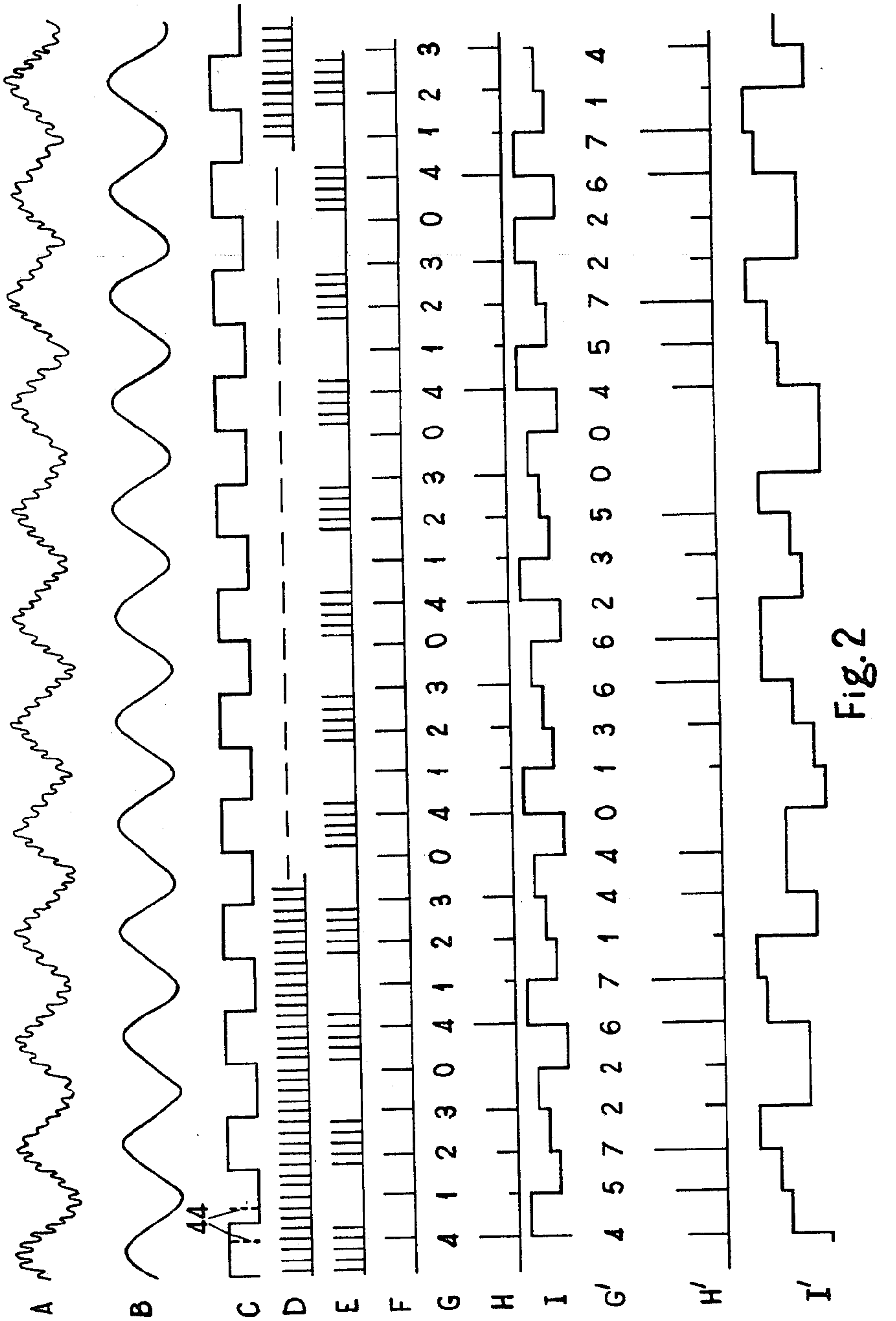
FIG. 2 shows waveforms occurring in the system of FIG. 1.

The operation of the system will now be considered in greater detail with reference to FIG. 2 which shows waveforms whose identifying letters correspond with those used in FIG. 1.

As shown in FIG. 2, the waveform A, produced by the amplifier 12 is filtered by the bandpass filter 14 to produce the waveform B. In the particular example being considered, the output from the amplifier 12 is assumed (purely by way of example) to comprise a low frequency sine wave on which is superimposed a much higher frequency ripple. This ripple (being outside the pass band of the filter 14) is removed by the bandpass filter 14 so as to leave the low frequency sine wave B. After passing through the limiting amplifier 16, this produces the rectangular wave C. It can be shown that the frequency spectrum of the signal C approximates to that of the original unclipped signal to a very considerable degree. This rectangular wave is then combined with the clock pulses D produced by the pulse generator 20, to produce the groups E of pulses.

Waveform F shows the sampling pulses produced by the divider 28, assuming (by way of example) that the divider 28 has a division factor of four. Each of these sampling pulses F causes the sampling gate 24 to read the state of the counter 22.

It will initially be assumed that each sampling pulse, after causing the gate 24 to sample the counter 22, resets the counter to zero via delay means 39, and, on this assumption, the decimal values of the counts read out from the counter 22 by the successive sampling pulses are shown at G in FIG. 2. Each of these decimal values is transmitted over the telemetry link 30 as a group G of bits as shown in FIG. 1, and converted by the digital to analogue converter 34 into a pulse H of corresponding height. The unit 36 converts these pulses into the rectangular waveform I which is fed into the analyser arrangement 38.

It is clear from FIG. 2 that the waveform I has a regular pattern which is dependent on the frequency of the rectangular waveform C from the bandpass filter 14 and on the frequency of the sampling pulses F. Since the sampling frequency is fixed and known, the waveform I, and indeed the transmitted number values read by the sampling gate 24, carry information concerning the frequency spectrum of the waveform C from the band pass filter 14 and thus of the incident sound energy received by the transducer 10.

The bank of filters 38 analyses the waveform I, and its various output terminals produce outputs representing the amplitudes of the different frequency components.

It is not in fact necessary for the sampling pulses to reset the counter 22 to zero each time. The count values read by the sampling gate 24, assuming that the sampling pulses do not reset the counter to zero, are shown at G' in FIG. 2. The count values shown at G' assume that the counter 22 has a capacity of 8. As before, these count values are transmitted over the telemetry link 30 in the form of respective groups of bits, and are converted by the converter 34 into pulses H' of corresponding amplitude. These pulses are converted into a waveform I' by the unit 36. It will be apparent that, like the waveform I, the waveform I' has a regular pattern (though not the same as the pattern of the waveform I). This pattern is again representative of the frequency of the waveform C and of the frequency of the sampling pulses F, and thus the waveform I', and the number values G' transmitted over the telemetry link 30, again carry information representing the frequency spectrum of the waveform C and thus of the incident sound energy received by the transducer 10.

It will thus be seen that the system described enables information concerning the frequency spectrum of an input signal to be transmitted in purely digital form. This very considerably simplifies the various components of the system with a consequent reduction in expense and increase in reliability.

The pulse repetition frequency of the pulse generator 20 should be high enough to avoid an intolerable level of noise arising from the harmonics of the signal in the wanted portion of the frequency spectrum. The frequency of the sampling pulses F should be adjusted so that signals arising from different parts of the frequency spectrum are not superimposed. It is desirable that the sampling frequency is at least twice the bandwidth of the bandpass filter 14. Thus, in particular embodiments, it has been found that suitable sampling frequencies can be close to the upper or lower limits of the pass band filter 14 or a sub-harmonic of one of these frequencies when a narrow pass band is employed. It is not essential for the sampling frequency to be a sub-multiple of the frequency of the pulse generator 20, though such arrangement may be advantageous.

The capacity of the counter and the sampling frequency are chosen so that a suitable "carrier" for the frequency spectrum is available and to accommodate the bandwidth of the signals passing through the filter 14. In particular, the capacity of the counter 22 represents the uncertainty as to the value of the counter between successive sampling intervals. The greater the bandwidth of the incident sound energy (thus the greater the bandwidth of the bandpass filter 14), the greater is this uncertainty and the larger is the required counter capacity. Similarly, the lower frequency for the sampling pulses F also increases the uncertainty thus necessitating an increase in counter capacity.

Figure 3:
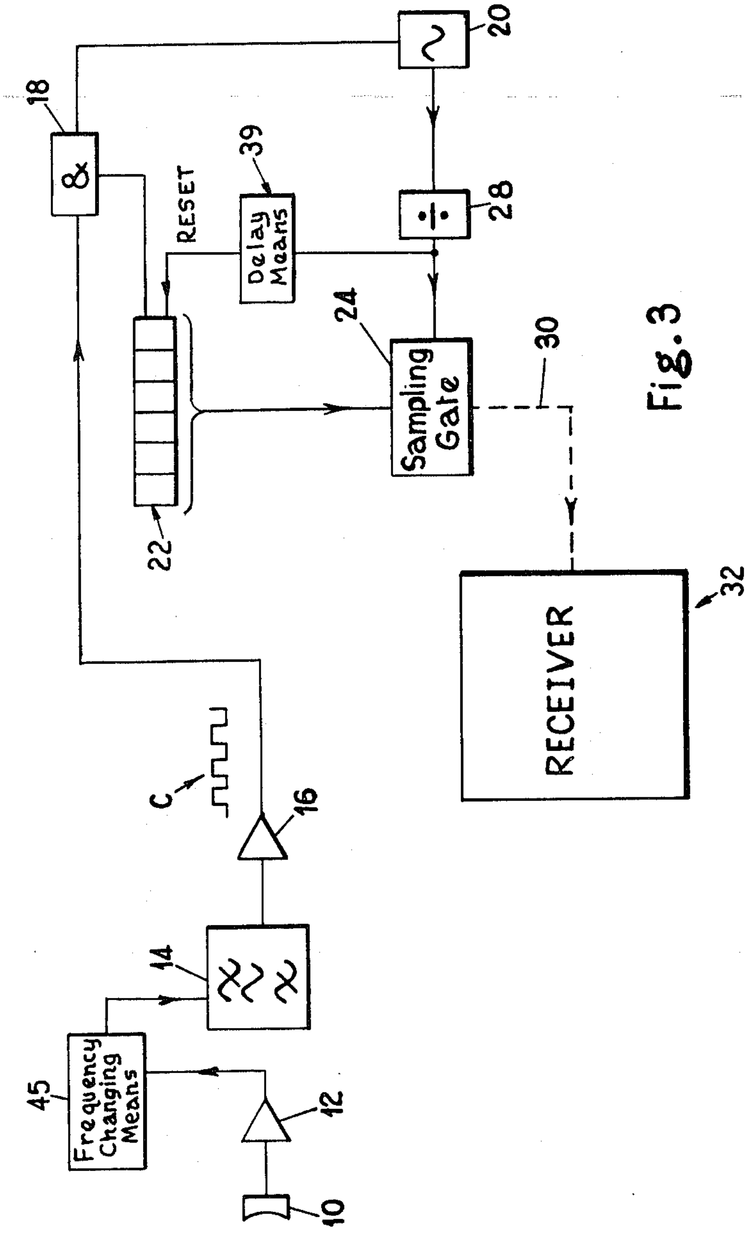
FIG. 3 shows a modification to the system of FIG. 1.

As explained above, the pass band of the filter 4 should be less than 1½ octaves. If the input signal is likely to have a bandwidth of more than this value, then a suitable frequency changing means 45 (see FIG. 3), positioned before the bandpass filter 14, may be employed to raise the signal frequency so that it is contained within a bandwidth which is less than 1½ octaves. In FIG. 3 the receiving equipment 32 is shown in block form only. It is pointed out that a considerably narrower bandwidth than 1½ octaves may be employed if required.

As explained, the system described does not transmit information representing the total energy received by the transducer 10 but transmits only the relative amplitudes of the various frequency components in the input signal. If it is desired to transmit information representing the total amplitude of the energy received by the transducer, then a frequency modulator could be inserted between the amplifier 12 and the filter 14 to convert the amplitude information into frequency terms. Instead, an additional signal having a predetermined amplitude and a predetermined frequency (the latter being just outside the pass band of the filter 14) could be fed into the system at a point 12A. The remainder of the system would be designed on the basis that the pass band of the filter 14 is in fact great enough just to include the frequency of the additional signal fed in at point 12A. Each waveform C now contains information not only representing the relative amplitudes of the various frequency components of the sound energy received but also representing the amplitudes of each of the components relative to the additional signal fed in the point 12A. All this information is transmitted through the telemetry link 30 and processed in the receiver 32 in the manner described. The output can now be analysed to obtain from it not only information representing the relative amplitudes of the different frequency components of the sound energy received but also the amplitude of the total sum of energy received relative to the additional signal (of known amplitude) fed in at the point 12A.

In a modification, applicable where the sampling gate 24 does not reset the counter 22 at each sample, the sampling gate 24 is arranged to read the bit in only one of the stages of the counter 22. The presence of the bandpass filter 14 limits the maximum and minimum widths of the pulses of the waveform C (as shown dotted at 44 in waveform C, by way of example). Thus, there are corresponding limits to the maximum and minimum number of clock pulses which are received by the counter 22 between successive sampling pulses F. Therefore, the most significant bits of the binary counts successively read out of the counter 22 are predictable and these bits need not be transmitted on the telemetry link 30. By an appropriate choice of sampling pulse frequency and counter size in relation to the pass band of the filter 14, the significant information can be confined to one digit position of the counter 22, and only the bit in this position need be sampled by the gate 24 and transmitted over the telemetry link 30.

In this modification, it will therefore be seen that the most significant stages of the counter 22 are never used and this part of the counter may be physically omitted. However, the least significant stages (those less significant than the single stage sampled) should not be physically omitted since, although they are not sampled, their states affect the state of the sampled stage, and some information would thus be lost if they were omitted.

Although the receiver 32 has been shown as comprising the digital-to-analogue converter 34, the pulse lengthening circuit 36, and the bank of filters 38, it may be replaced by other analysing means such as, for example, a digital computer programmed with a Fast Fourier Transform (FFT) program.

Figure 4:
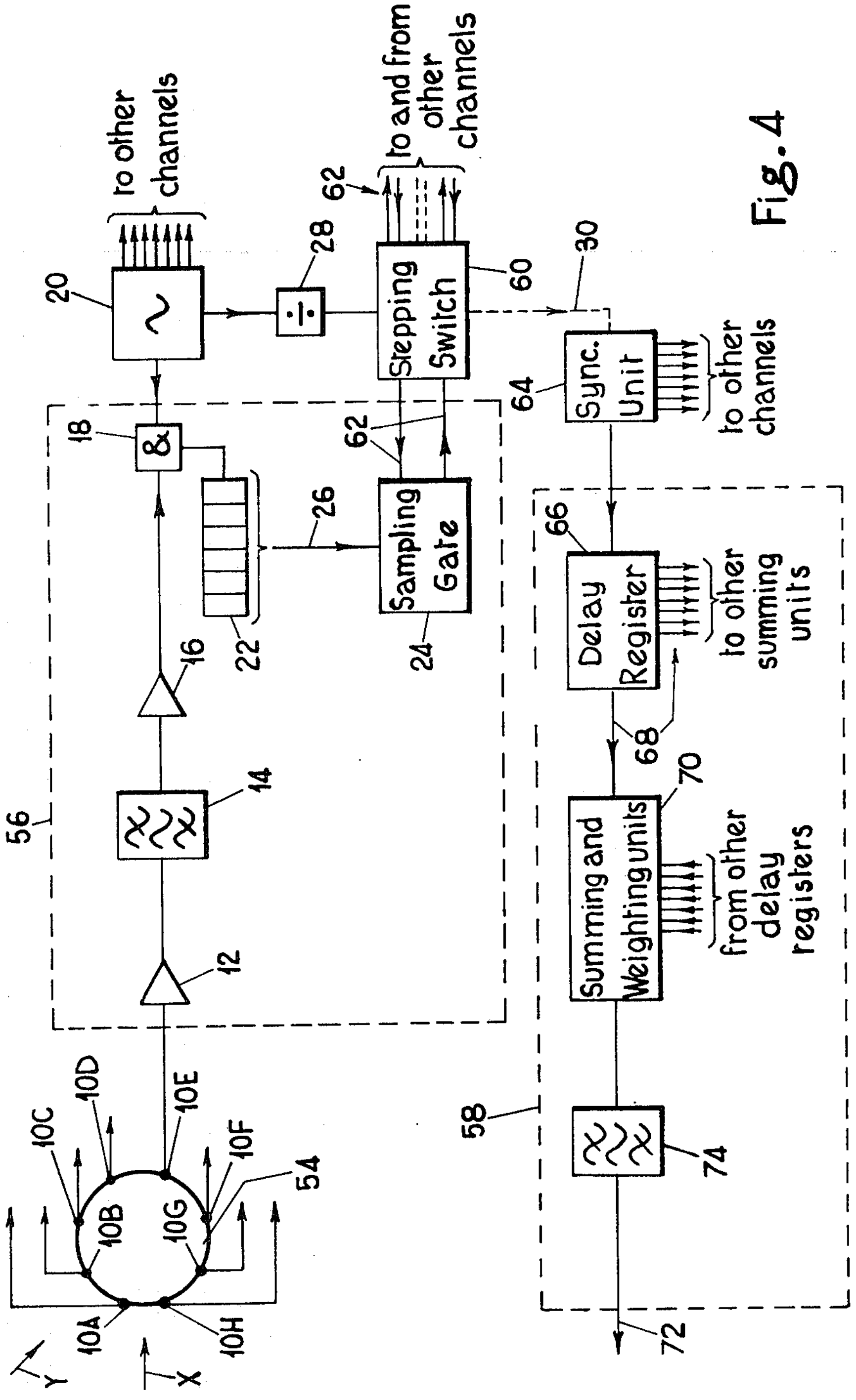
FIG. 4 is a block diagram of another of the systems.

In other applications, however, the receiver 32 does not contain analysing means for analysing the frequency spectrum of the received signal but comprises equipment for performing other functions on the transmitted signal, treating the transmitted signal as an analogue signal representing the frequency spectrum of the received signal. FIG. 4 shows such a system, and items in FIG. 4 corresponding to items in FIG. 1 are similarly referenced.

The system of FIG. 4 is for transmitting data comprising the sound energy respectively picked up by eight transducers 10A to 10H arranged in a circular array 54. Each transducer 10A to 10H picks up only a small proportion of the sound energy incident upon it, but it may be assumed that all the transducers receive substantially the same energy. However, the amplitudes of the sound energy received by the eight transducers at any instant are not the same. Thus, for example, energy arriving at the array 54 in a direction X will reach the transducers 10A and 10H first, then the transducers 10B and 10G, then the transducers 10C and 10F and finally the transducers 10D and 10E. Similarly, energy arriving at the array 54 in a direction Y will reach the transducers 10A and 10B first, then the transducers 10C and 10H, then the tranducers 10D and 10G, and finally the transducers 10E and 10F. It will therefore be seen that the mutual phase relationship of the electrical signals produced by the transducers is dependent on the direction of arrival of the sound energy.

The eight electrical signals produced by the transducers are fed respectively into eight similar channels. FIG. 4 illustrates only one such channel. Each channel comprises a transmitter section 56 and a receiver section 58, and each transmitter section is the same as the corresponding part of the system of FIG. 1. The clock pulse generator 20 is common to the eight channels as is the pulse frequency divider 28. The output of the latter is not connected directly to the sampling gates 24 in the eight channels but is conncted thereto via a stepping switch 60. By means of lines 62, this stepping switch activates the eight sampling gates 24 sequentially and feeds the read-out information on to the telemetry link 30.

At the receiving end of the telemetry link 30 is a synchronising unit 64 which is operative in synchronism with the stepping switch 60 so as to feed each of the received groups of binary signals into the appropriate one of the eight receiver sections 58.

Each receiver section comprises a delay register 66 which receives the digital signals for that channel and has eight output lines 68. The output on each of these lines is identical with the input except that it is delayed by a predetermined amount with respect thereto.

Each receiver section also includes a respective summing and weighting unit 70. The summing and weighting unit 70 in each channel receives an input from the delay register 66 of that channel and also receives seven other inputs which are respectively fed from the delay registers in the other channels.

Each summing and weighting unit 70 is connected to an output line 72 via a respective bandpass filter 74.

In operation, each transmitter section 56 operates in the manner explained in connection with FIG. 1 to produce a succession of groups G of bits on the telemetry link 30; these represent the count state of the counter 22 at the instant of sampling and also, as explained, carry information representing the frequency spectrum of the received sound energy applicable to that channel.

Each delay register 66 operates so that the groups of bits on the particular one of its output lines 68 connected to the summing and weighting unit 70 in the same channel are delayed in a manner dependent on the physical position in the array 54 of the particular transducer applicable to that channel. Each delayed digital signal received by the particular unit 70 being considered is then weighted in the unit 70 in a particular manner also according to the particular physical position in the array of the corresponding transducer. The unit 70 then combines the delayed and weighted signals to produce a combined digital output signal. The delays and weightings applied to the signals are such as to adjust the mutual phase relationship of the signals whereby the combined digital output from the unit 70 being considered represents the total sound energy received by the array 54 in a particular response direction.

The combined digital output from the unit 70 being considered is then passed into the bandpass filter 74 which rejects harmonics introduced by the limiting amplifiers 16 and produces an analogue output signal on the line 72 representing the sound energy received in the particular response direction.

In similar fashion, the units 66, 70 and 74 of each of the other seven channels are arranged such that each of these channels produces, on its output line 72, an output signal representing the sound energy received in a different, but predetermined, direction.

Clearly, there may be more or less than the eight transducers and channels shown.

The combined digital output signal from each unit 70 contains frequency spectra repeated identically at each multiple of the sampling frequency, and each of these spectra corresponds substantially to the single spectrum of the sound energy received by the array 54 in the particular response direction. Thus, the centre frequency of the passband of the filter 74 can be chosen so as to select any one of the spectra as desired: that is, the spectrum of the output on the line 72 need not be centred about the same frequency as the sound energy received by the array 54 but may be a lower or higher frequency replica of the spectrum as desired.

We claim:

1. A data handling system responsive to the frequency spectrum of an input, comprising:

converting means connected to receive the input and operative to convert it into an electrical signal having a substantially rectangular waveform which changes from one of two amplitudes to the other in correspondence with each crossing by the input of a predetermined datum level, a source of pulses having a pulse repetition frequency substantially greater than the frequency of the rectangular waveform, coincidence means connected to receive the rectangular waveform and the said pulses and operative to allow the pulses to pass through only while the rectangular waveform has a first one of the two amplitude values, a plurality of concatenated binary counter stages the first of which is connected to receive the pulses passed through the coincidence means whereby the counter stages respectively register successively more significant digits of a digital count, sampling means operative at each of periodic instants to sample the digital value of at least one of the less significant digits of the accumulated digital count such that successive sampled values are related to each other in a manner determined by the frequency spectrum of the input, transmitting means connected to the sampling means and operative to transmit the sampled digital values, and receiving means responsive to the transmitted values to produce an output representative of the frequency spectrum of the input.

2. A system according to claim 1, including means for limiting the bandwidth of the input signal to less than one and one half octaves.

3. A system according to claim 2, including frequency changing means responsive to the input and operative to increase the frequency of the input whereby to decrease its bandwidth prior to its being fed to the converting means.

4. A system according to claim 1, in which the sampling frequency is greater than twice the bandwidth of the input.

5. A system according to claim 1, in which the receiving means comprises analysing means responsive to the received digital values and operative to produce a plurality of output signals each indicative of the amplitude of a particular frequency component of the input.

6. A system according to claim 5, in which the analysing means comprises:

means responsive to the received digital values to produce an analogue signal whose successive changes in amplitude correspond with successive changes in the digital values, and filter means responsive to the analogue signal to produce a plurality of output signals whose relative amplitudes correspond with the relative amplitudes of the different-frequency components of the input.

7. A system according to claim 1, in which the sampling means includes resetting means operative to reset the digital counting means immediately after each sample.

8. A system according to claim 1, in which the capacity of the counting means and the frequency of sampling are so related to the bandwidth of the input from which the rectangular waveform was derived that the maximum change in width of each first amplitude portion of the rectangular waveform changes the binary count of only one stage of the counting means, the sampling means being arranged to sample the digital value of this stage only.

9. A system according to claim 1, including frequency dividing means connected to receive the said pulses and operative to produce control pulses at a sub-multiple of the pulse repetition frequency, and means responsive to each control pulse to operate the sampling means.

References Cited

UNITED STATES PATENTS

| | | | |
|---|---|---|---|
| 3,144,802 | 8/1964 | Faber et al. | 324—78 D |
| 3,473,121 | 10/1969 | Hurtig et al. | 324—77 E |

ALFRED E. SMITH, Primary Examiner

U.S. Cl. X.R.

324—77 E